(12) United States Patent
Kuroda (10) Patent No.: US 6,871,083 B2
(45) Date of Patent: Mar. 22, 2005

(54) PORTABLE RADIO DEVICE (75) Inventor: Mitsuru Kuroda, Tokyo (JP)

(73) Assignee: NEC Corporation, Tokyo (JP)

( * ) Notice: Subject to any disclaimer, the term of this patent is extended or adjusted under 35 U.S.C. 154(b) by 507 days.

(21) Appl. No.: 09/771,626

(22) Filed: Jan. 30, 2001

(65) Prior Publication Data

US 2001/0011030 A1 Aug. 2, 2001

(30) Foreign Application Priority Data

Jan. 31, 2000 (JP) ........................................ 2000-022861

(51) Int. Cl.⁷ ............................................... H04B 1/38
(52) U.S. Cl. .................... 455/566; 455/575.1; 455/90.3; 455/550.1
(58) Field of Search .............................. 455/566, 550.1, 455/90.3, 575.1, 575.3, 575.8, 550, 90.1; 345/7, 8; 359/817

(56) References Cited

U.S. PATENT DOCUMENTS

| | | | |
|---|---|---|---|
| 5,491,491 A | * | 2/1996 | Lebby et al. ................... 345/7 |
| 5,633,762 A | * | 5/1997 | Richard ........................ 359/817 |
| 5,684,497 A | * | 11/1997 | Hildebrand et al. ........... 345/8 |
| 5,821,911 A | * | 10/1998 | Jachimowicz .................. 345/7 |
| 5,970,418 A | | 10/1999 | Budd et al. |
| 6,029,073 A | * | 2/2000 | Lebby et al. ............... 455/566 |
| 6,085,112 A | * | 7/2000 | Kleinschmidt et al. .. 455/556.1 |
| 6,275,714 B1 | * | 8/2001 | Kintz et al. .................. 455/566 |
| 6,311,077 B1 | * | 10/2001 | Bien ........................... 455/566 |
| 6,360,104 B1 | * | 3/2002 | Budd et al. .................. 455/566 |
| 6,424,823 B1 | * | 7/2002 | Moles ......................... 455/90.1 |
| 6,518,940 B2 | * | 2/2003 | Nagano .......................... 345/7 |
| 2001/0027125 A1 | * | 10/2001 | Kiyomatsu et al. ......... 455/566 |

FOREIGN PATENT DOCUMENTS

| | | |
|---|---|---|
| EP | 0 763 763 A1 | 3/1997 |
| EP | 0 770 896 A1 | 5/1997 |
| EP | 0 888 005 A2 | 12/1998 |
| GB | 2 308 486 A | 6/1997 |
| GB | 2 360 664 A | 9/2001 |
| JP | 05-37928 | 2/1993 |
| JP | 06-12047 | 1/1994 |
| JP | 08-237393 | 9/1996 |
| JP | H09-219755 | 8/1997 |
| JP | 11-32379 | 2/1999 |
| JP | 11-196163 | 7/1999 |
| JP | 11-237584 | 8/1999 |
| JP | 2000-059853 | 2/2000 |
| JP | 2000-181375 | 6/2000 |
| WO | 00/03285 | 1/2000 |

* cited by examiner

Primary Examiner—Edward F. Urban
Assistant Examiner—Lana Le
(74) Attorney, Agent, or Firm—Sughrue Mion, PLLC (57) ABSTRACT A portable radio device permits the user to use contents on the Internet with a sufficiently large display screen size without impairing the portability of its own. The portable radio device has a lid, a lower device portion, and an upper device portion. The lid is angularly movably mounted on the lower device portion by a joint, and can be folded over the lower device portion. The upper device portion is angularly connected to the lower device portion by a hinge, and can be folded over the lower device portion and the lid which has been folded over the lower device portion. The lid has a concave reflecting mirror disposed on the reverse side thereof. The lower device portion includes a projection display device disposed on a surface thereof for projecting an image onto the concave reflecting mirror when the lid is opened. Light rays of the displayed image are projected from the projection display device and reflected by the concave reflecting mirror and recognized as representing an enlarged image by the user.

14 Claims, 6 Drawing Sheets

PORTABLE RADIO DEVICE

BACKGROUND OF THE INVENTION

1. Field of the Invention

The present invention relates to a portable radio device, and more particularly to a portable radio device with an information display capability.

2. Description of the Related Art

Various services available on the Internet are in widespread use today. There is a growing need for the users of radio devices, typically portable telephone sets, to connect to the Internet and receive those available services. However, since contents on the Internet are designed and prepared for use by personal computers having sufficiently large display screen sizes, it is difficult to recognize all the information of those contents with display screen sizes of liquid crystal display panels of portable telephone sets. Therefore, the information of contents displayed by the liquid crystal display panels of portable telephone sets has suffered various limitations. Those users who want to see information available on the Internet with sufficiently large display screen sizes anywhere at any time can receive the services only with a notebook personal computer that is connected to a personal digital assistant (PDA) or to a radio device by a cable.

Carrying a notebook personal computer together with a personal digital assistant or a radio device at all times is very inconvenient and troublesome to the user. Therefore, there has been a demand for a portable radio device which can be carried around with ease and which allows the user to use contents on the Internet with a display screen similar to those of notebook personal computers.

SUMMARY OF THE INVENTION

It is therefore an object of the present invention to provide a portable radio device which permits the user to use contents on the Internet with a sufficiently large display screen size without impairing its own portability.

According to the present invention, there is provided a portable radio device comprising a flat lid having on a surface thereof a concave reflecting member having a predetermined curvature, and a small-size display device having an information display function for projecting light rays of a displayed image, the lid and the display device being adjustable in their positional relationship for applying light rays of a displayed image projected from the display device to the concave reflecting member and reflecting the light rays at an enlarged scale from the concave reflecting member.

The portable radio device may further comprise a casing, the flat lid being angularly movably coupled to an end of the casing by a hinge mechanism, the small-size display device being positioned with respect to the lid such that when the lid is angularly moved and held at a given angle, light rays of a displayed image projected from the display device is applied to the concave reflecting member and reflected at an enlarged scale from the concave reflecting member.

The small-size display device may be angularly movably mounted on the casing or the flat lid.

The portable radio device may further comprise a casing and a module casing detachably connected to the casing, the small-size display device being mounted in the module casing, the flat lid being angularly movably coupled to an end of the module casing by a hinge mechanism. The module casing may have an external interface connector, and the casing may have a connector which electrically connects the casing to the external interface connector, the module casing being structurally connected to the casing by the connector.

The small-size display device may be angularly movable for positional adjustment.

The portable radio device may be used as a portable telephone set.

With the above arrangement of the present invention, the portable radio device has the flat lid angularly movably coupled to the end of the casing by the hinge mechanism and having a concave mirror as the concave reflecting member, and the small-size display device having the information display function. The portable radio device is based on the principles that when an object is moved closer to the concave mirror than the focal point thereof, the image of the object is enlarged by the reflecting mirror. When the lid is angularly moved and held at a certain angle, light rays of a displayed image projected from the display device are reflected by the concave mirror and recognized as representing an enlarged image by the user. Since the light rays projected from the display device are reflected by the concave mirror and recognized as representing an enlarged image by the user, the portable radio device provides an information display capability which is much better than the information display capability of a conventional LCD display screen size, though the display device may be a small-size LCD, for example.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

A portable radio device according to a first embodiment of the present invention will be described below with reference to FIGS. 1 through 4.

In the first embodiment, the portable radio device comprises a portable telephone set, and a display device thereof comprises an LCD panel.

Figure 1:
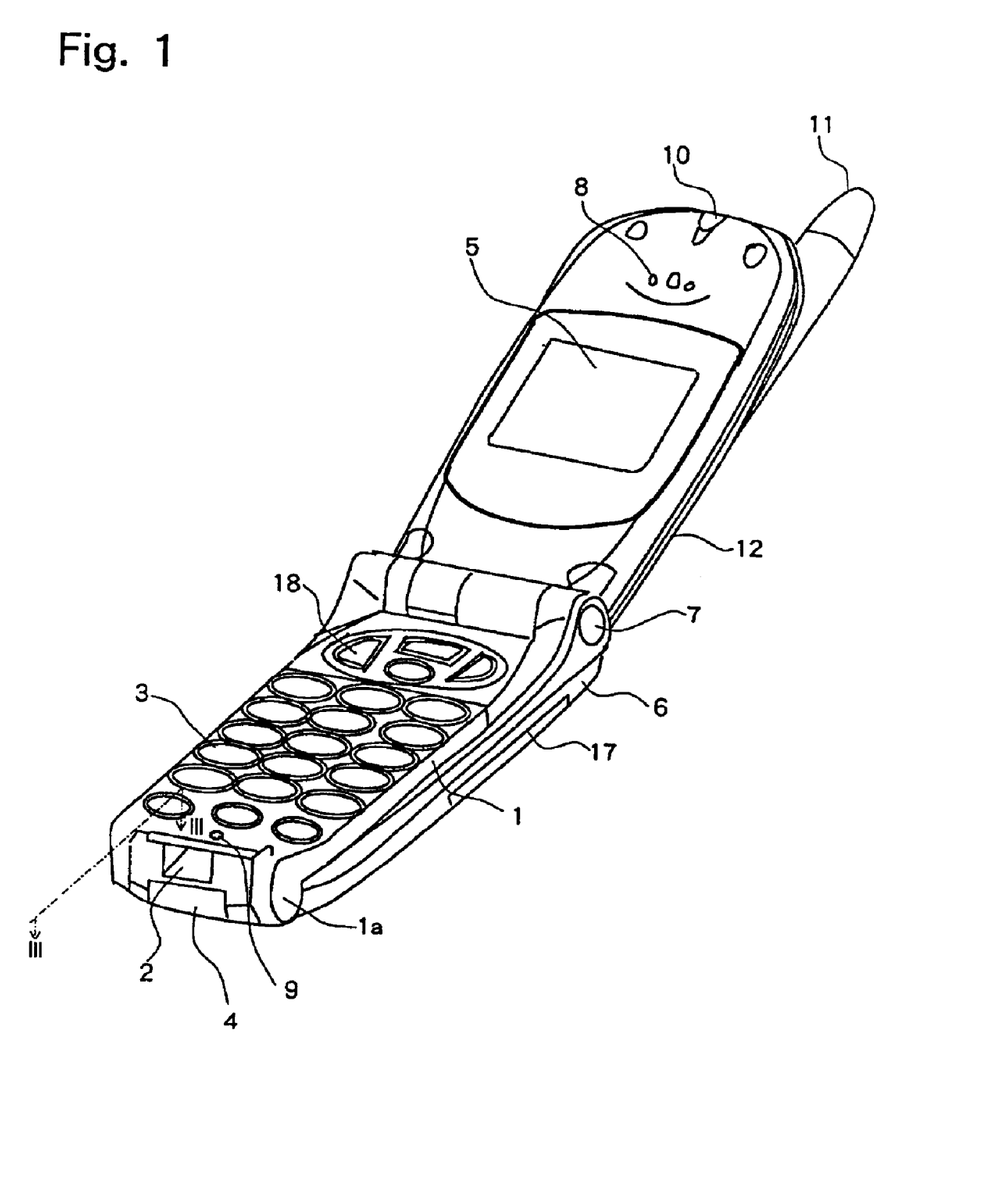
FIG. 1 is a perspective view of a portable radio device with an upper device portion thereof being open, according to a first embodiment of the present invention.
Figure 2:
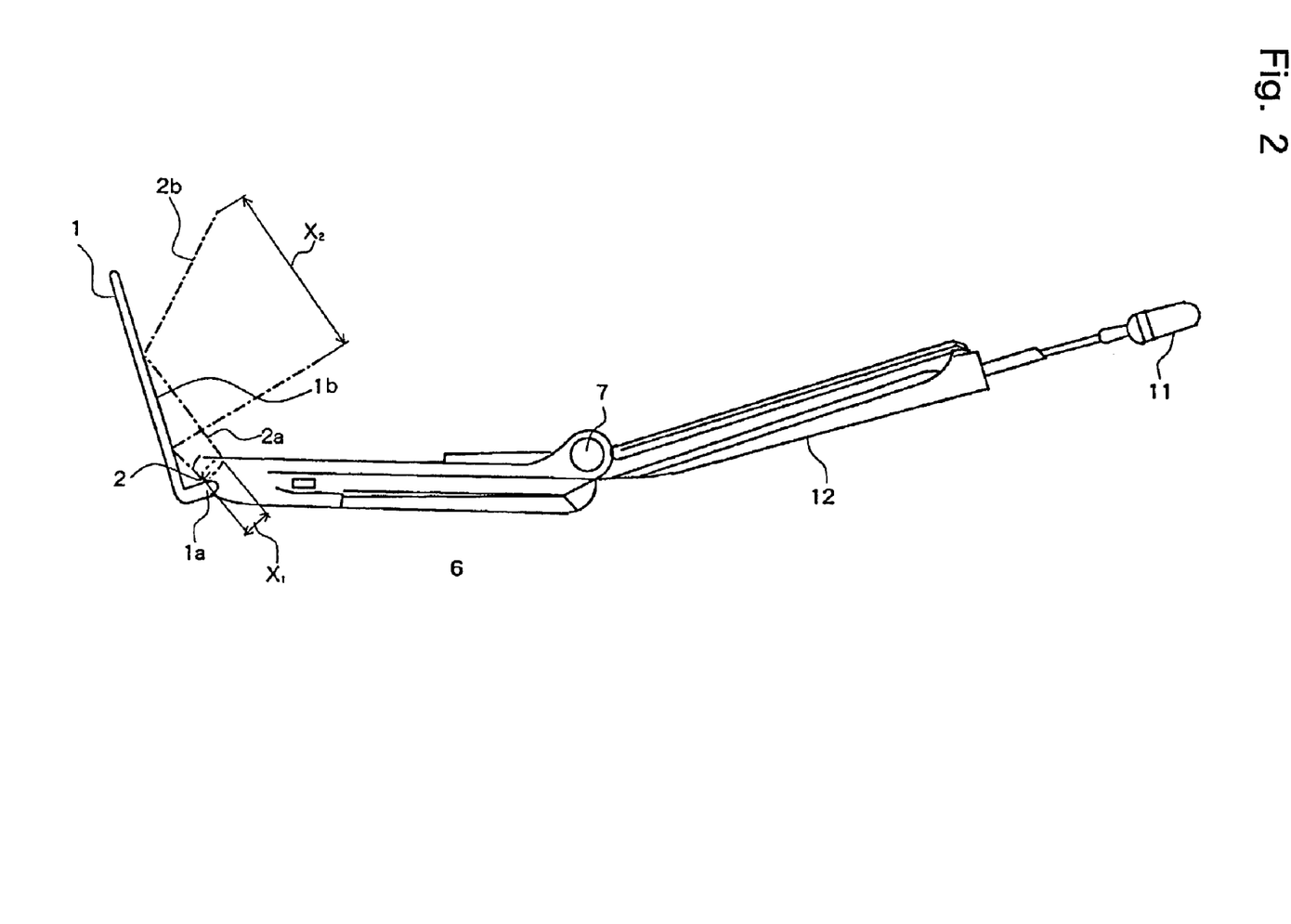
FIG. 2 is a side elevational view of the portable radio device shown in FIG. 1 with a lid being open.

As shown in FIGS. 1 and 2, the portable radio device comprises lid 1, lower device portion 6, and upper device portion 12. Lid 1 is angularly movably mounted on lower device portion 6 by joint 1a, and can be folded over lower device portion 6. Upper device portion 12 is angularly connected to lower device portion 6 by hinge 7, and can be folded over lower device portion 6 and lid 1 that has been folded over lower device portion 6.

Figure 3:
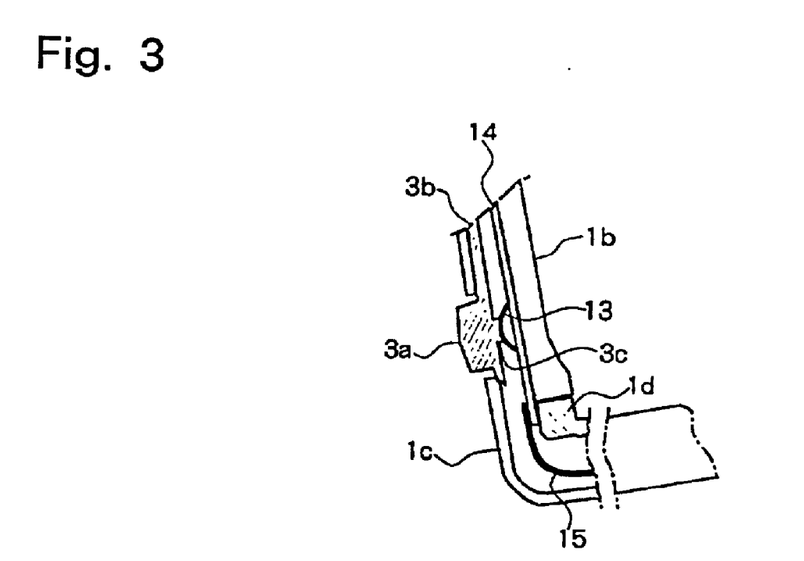
FIG. 3 is an enlarged cross-sectional view taken along line III—III of FIG. 1, showing a portion of the lid near its hinged end.

As shown in FIG. 3, lid 1 has concave reflecting mirror 1b disposed on the reverse side thereof and engaged by inner contact surface casing 1d. As shown in FIG. 2, lower device portion 6 includes projection LCD 2 disposed on a surface thereof for projecting an image onto concave reflecting mirror 1b when lid 1 is opened.

According to a feature of the present invention, the portable radio device has, on one end of its housing, flat lid 1 angularly mounted on the end of the housing by joint 1a of a hinge mechanism and having concave reflecting mirror 1b on one surface thereof, and small-size projection LCD 2 having an information display function. When lid 1 is angularly moved and held at a certain angle, light rays projected from projection LCD 2 are enlarged to a large scale by concave reflecting mirror 1b and visually recognized by the user of the portable radio device. As shown in FIG. 2, light rays having width $X_1$ which are projected from projection LCD 2 are enlarged to a large scale by concave reflecting mirror 1b on one surface of lid 1, and visually recognized as having width $X_2$ by the user. Though projection LCD 2 is of a small size, the portable radio device provides an information display capability of a conventional LCD display screen size.

The structure of portable radio device according to the first embodiment as it is applied to a foldable portable telephone set will be described in greater detail below with reference to FIGS. 1 through 4. The portable telephone set has upper device portion 12 and lower device portion 6. Upper device portion 12 primarily has antenna 11, LCD 10 for indicating incoming calls, receiver 8 for producing sounds based on radio signals that have been transmitted, LCD 5 for displaying various pieces of information, and a built-in electric circuit which electrically interconnects those components and has predetermined functions. Lower device portion 6 primarily has battery pack 17 for supplying electric energy, control buttons 18 for entering information, I/O connector 4 for connection to an external interface, projection LCD 2 which is smaller in size than LCD 5 of upper device portion 12 and inclined at a certain angle, and a built-in electric circuit which electrically interconnects those components and has predetermined functions. Upper device portion 12 and lower device portion 6 are coupled to each other by hinge 7 such that when they are closed, i.e., folded over each other, the surface of upper device portion 12 which has LCD 5 and the surface of the lower device portion 6 which has control button 18 are substantially held in contact with each other, and when are opened, i.e., unfolded away from each other, the surface of upper device portion 12 which has LCD 5 and the surface of the lower device portion 6 which has control buttons 18 are angularly spaced from each other by a certain angle.

The portable telephone set also has lid 1 angularly movably coupled to the end of lower device portion 6 by joint 1a. Lid 1 has its face lying flush with the surface of lower device portion 6 which has control buttons 18 when lid 1 is closed on lower device portion 6. Lid 1 has on its face buttons 3 and sound hole 9 associated with a microphone for detecting voice sounds. The microphone may be installed in lower device portion 6 or lid 1. As shown in FIG. 3, each of buttons 3 is attached to lid 1 by base 3b in the form of a thin plate, and has concave surface 3a and projection 3c for operational purpose. When concave surface 3a is pressed, metal dome 13 mounted on printed circuit board 14 is depressed, transmitting an entered signal via flexible printed board 15 to lower device portion 6. Flexible printed board 15 extends through joint 1a into lower device portion 6. Concave reflecting mirror 1b, which has a certain size and curvature, is mounted on an inner surface of lid 1 for contact with lower device portion 6, and integrally fixed to lid 1 by fitting or bonded engagement. Rather than using concave reflecting mirror 1b, a portion of inner contact surface casing 1d may be of a shape which is the same as the concave reflecting mirror, and processed into a mirror surface as by evaporation. Therefore, the number of the components may be cut down.

Figure 4:
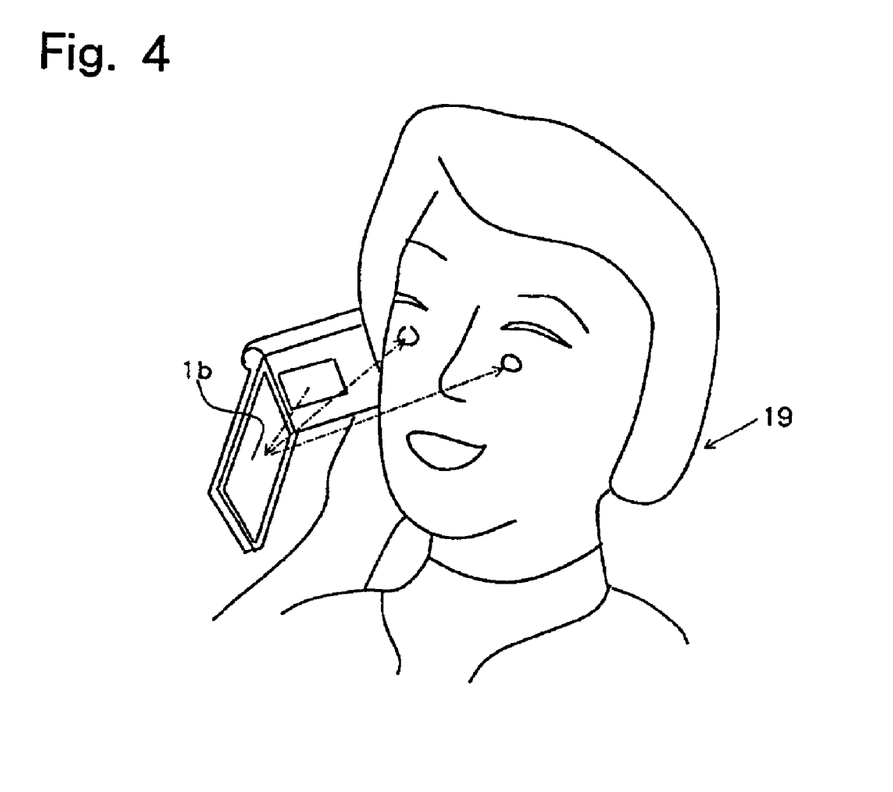
FIG. 4 is a view showing the manner in which the user uses the portable radio device according to the first embodiment of the present invention.

The portable telephone set thus constructed is used as follows: When in use, the portable telephone set is unfolded as shown in FIG. 2. Specifically, upper device portion 12 is angularly moved and held at a certain angle with respect to lower device portion 6. Then, lid 1 is angularly moved and held at a certain angle with respect to lower device portion 6. Light rays 2a projected from projection LCD 2 are reflected as light rays 2b by concave reflecting mirror 1b on the inner contact surface of lid 1. Concave reflecting mirror 1b has a curvature such that the width $X_1$ of the display screen of projection LCD 2 is much smaller than the width $X_2$ of the reflected image. Therefore, the eyes of the user visually recognize the display screen size of projection LCD 2 as a much larger display screen size as shown in FIG. 4. With this arrangement, the portable radio device permits the user to use contents on the Internet with a sufficiently large display screen size without impairing the portability of its own.

Ordinary portable telephone sets do not need to have a large LCD as LCD 5 which is only its display means, but may have a LCD of a required minimum size for satisfying desired requirements. In extreme cases, ordinary portable telephone sets may not have any LCD. Recently, there has been discussion about providing portable telephone sets with large color LCDs. However, color LCDS require consumption of a greater amount of electric energy as their size increases. Since portable telephone sets should be lightweight and small in size, it is difficult for them to incorporate a large-capacity battery in view of the weight and size of the battery. According to the present invention, inasmuch as a small color LCD is sufficient, it is possible to provide a portable telephone set which is able to reduce any increase in its power consumption and which is lightweight and small in size.

In the first embodiment, projection LCD 2 is fixed in place. However, projection LCD 2 may also be angularly movable, so that when the user turns lid 1 to any desired angle, projection LCD 2 may also be turned to project an enlarged reflected image toward the eyes of the user. Therefore, projection LCD 2 that is angularly movable makes the portable telephone set highly flexible to meet different face sizes of users and different individual ways in which different users hold the portable telephone set.

The portable radio device according to the first embodiment has been described as being applied to a portable telephone set. However, the principles of the present invention are also applicable to a wide range of portable radio devices. In addition, the display device is not limited to an LCD panel.

Figure 5:
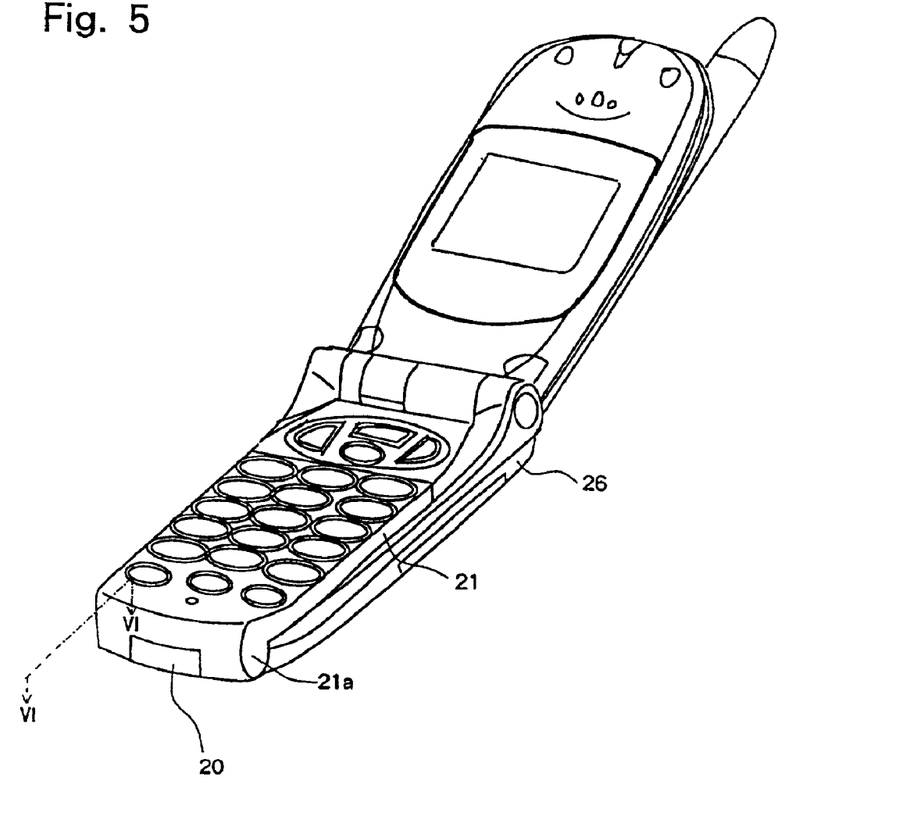
FIG. 5 is a perspective view of a portable radio device with an upper device portion thereof being open, according to a second embodiment of the present invention.
Figure 6:
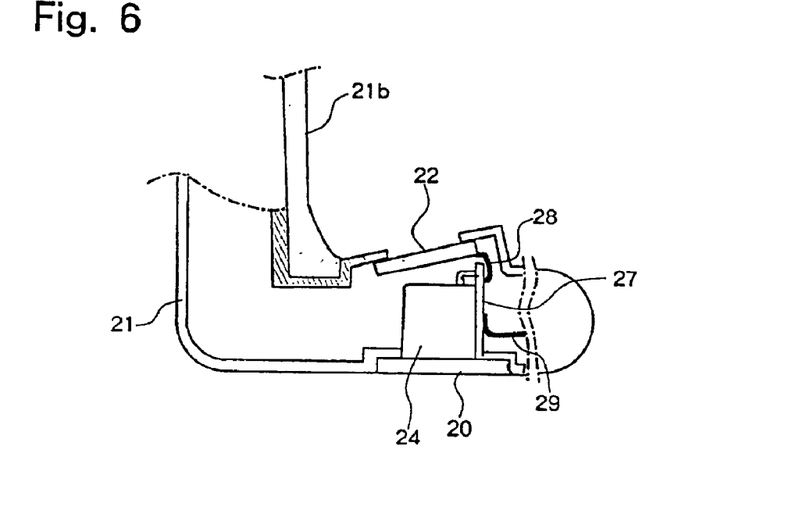
FIG. 6 is an enlarged cross-sectional view taken along line VI—VI of FIG. 5, showing a portion of a lid near its hinged end with the lid being open.

A portable radio device according to a second embodiment will be described below with reference to FIGS. 5 and 6. The portable radio device will be described below as a portable telephone set.

In the first embodiment, projection LCD 2 is mounted in lower device portion 6. According to the second embodiment, projection LCD 22 is mounted in lid 21. Other structural details of the portable radio device according to the second embodiment are identical to those of the portable radio device according to the first embodiment, and will not be described in detail below.

Structural details of projection LCD 22 will be described below with reference to FIG. 6. Projection LCD 22, which is of a small size, is disposed in confronting relation to concave reflecting mirror 21b at a certain angle such that projection LCD 22 projects light rays in a suitable direction toward concave reflecting mirror 21b when in use. Concave reflecting mirror 21b has such a curvature as to greatly enlarge the display screen size of projection LCD 22 as recognized by the user, as with the first embodiment. Since concave reflecting mirror 21b and projection LCD 22 are disposed on lid 21 as described above, they can initially be integrally constructed in an optimum positional relationship and layout. Inasmuch as lid 21 is angularly movably mounted on lower device portion 26 by joint 21a, when the user turns lid 21 to any desired angle, an enlarged reflected image can be projected toward the eyes of the user. Therefore, the portable telephone set is highly flexible to meet different face sizes of users and different individual ways in which different users hold the portable telephone set. Lid 21 houses therein I/O connector 24 for connection to an external interface and protective cover 20 thereof which are disposed between an end of lid 21 and joint 21a. Lid 21 also houses therein flexible printed board 28 which electrically connects printed circuit board 27 with I/O connector 24 thereon to projection LCD 22, and flexible printed board 29 which electrically connects printed circuit board 27 to lower device portion 26 via joint 21a.

Figure 7:
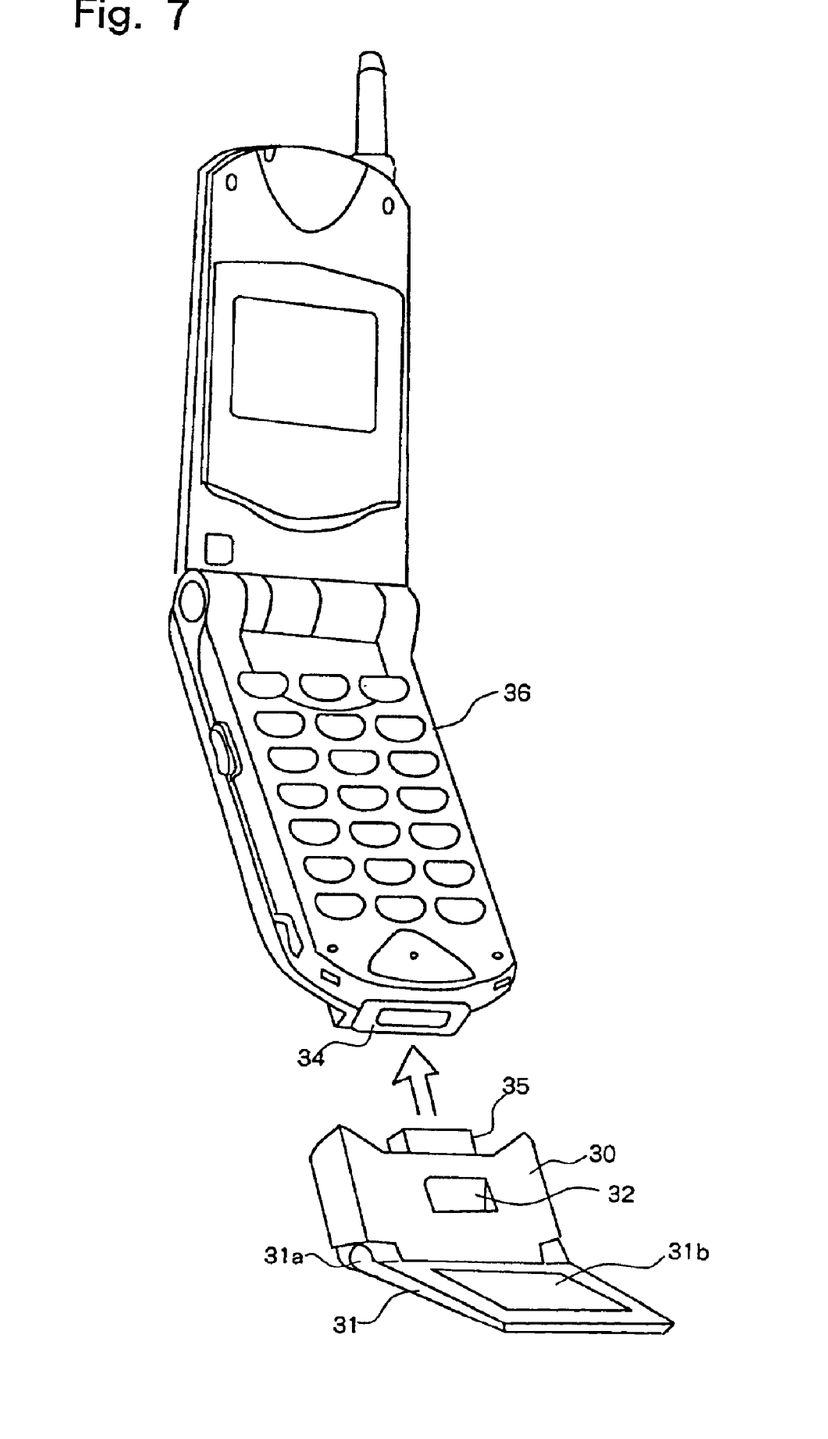
FIG. 7 is a perspective view of a portable radio device with an upper device portion thereof being open, according to a third embodiment of the present invention, showing the manner in which a module is attached to the portable radio device.
Figure 8:
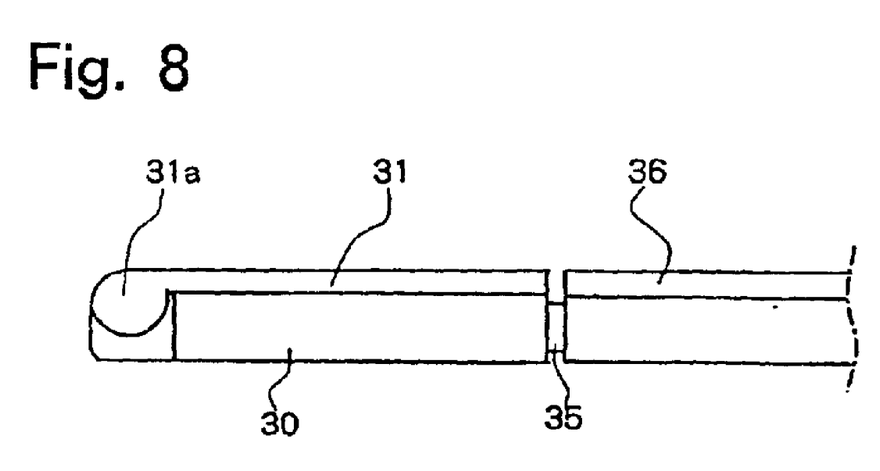
FIG. 8 is a fragmentary side elevational view of a lower device portion of the portable radio device shown in FIG. 7 and a module casing as it is connected to the lower device portion.

A portable radio device according to a third embodiment will be described below with reference to FIGS. 7 and 8. The portable radio device will be described below as a portable telephone set.

In the first embodiment, projection LCD 2 is mounted in lower device portion 6. In the second embodiment, projection LCD 22 is mounted in lid 21. According to the third embodiment, projection LCD 32 and concave reflecting mirror 31b are incorporated in a detachable display extension module. Other structural details of the portable radio device according to the third embodiment are identical to those of the portable radio device according to the first embodiment, and will not be described in detail below.

Structural details of the display extension module will be described below with reference to FIGS. 7 and 8. The display extension module comprises module casing 30 substantially in the form of a box and thin flat lid 31 angularly coupled to module casing 30 by a joint 31a. Module casing 30 houses therein projection LCD 32 obliquely fixed at a certain angle. Lid 31 has concave reflecting mirror 31b which has a curvature such that reflects light rays projected from an image displayed by projection LCD 32 as an enlarged image to a desired position. A connector 35 projecting from module casing 30 is electrically and physically connected to I/O connector 34 on an end of lower device portion 36 of the portable telephone set. When lid 31 is closed, as shown in FIG. 8, it is folded so as to be neatly integrally combined with module casing 30 and hence mounted compactly on module casing 30. With the above arrangement, the user can connect the display extension module to and remove it from the portable telephone set as required, and hence finds it easy to use the display extension module. The display extension module can be handled as an independent optional unit. By making the connectors as standardized components, the display extension module can be used with a wide range of general portable telephone sets and hence makes itself highly versatile.

As described above, the portable radio device according to the present invention has a flat lid angularly movable coupled by a hinge mechanism and having a concave reflecting mirror on its surface, and a small-size projection display device having an information display capability, the lid and the projection display device being mounted on an end of a casing. When the lid is angularly moved and held at a certain angle, light rays projected from an image displayed on the projection display device are reflected by the concave reflecting mirror and recognized as representing an enlarged image by the user. Thus, though the projection LCD is of a small size, the portable radio device provides an information display capability which is much better than the information display capability of a conventional LCD display screen size.

If both the concave reflecting mirror and the projection display device are mounted on the lid, then light rays projected from an image displayed on the projection display device are reflected by the concave reflecting mirror on the lid and recognized as representing an enlarged image by the user in a wide range of angular movement of the lid.

If the projection display device is angularly movable, then light rays projected from an image displayed on the projection display device are reflected by the concave reflecting mirror on the lid and recognized as representing an enlarged image by the user in a wide range of angular movement of the lid.

Since the projection display device is of a small size, the power consumption of the portable radio device can be reduced. Such an advantage manifests itself particularly when the projection display device is a color display device.

It is to be understood, however, that although the characteristics and advantages of the present invention have been set forth in the foregoing description, the disclosure is illustrative only, and changes can be made in the arrangement of the parts within the scope of the appended claims.

What is claimed is:

1. A portable radio device comprising:
   a display device for projecting light rays of a displayed image; and
   a lid with a reflecting member that reflects said light rays of said displayed image at an enlarged scale;
   wherein said lid and said display device being adjustable in their positional relationship for applying light rays of a displayed image projected from said display device to said reflecting member.

2. A portable radio device according to claim 1, for use as a portable telephone set.

3. A portable radio device according to claim 1, further comprising:
   a casing;
   said lid being angularly movably coupled to an end of said casing by a hinge mechanism;
   said display device being positioned with respect to said lid such that when said lid is angularly moved and held at a given angle, said light rays of said displayed image are reflected by said reflecting member at an enlarged scale.

4. A portable radio device according to claim 3, wherein said display device is angularly movable for positional adjustment.

5. A portable radio device according to claim 3, for use as a portable telephone set.

6. A portable radio device according to claim 3, wherein said display device is mounted on said casing.

7. A portable radio device according to claim 6, wherein said display device is angularly movable for positional adjustment.

8. A portable radio device according to claim 3, wherein said display device is mounted on said lid.

9. A portable radio device according to claim 1, wherein said display device comprises a projection LCD.

10. A portable radio device according to claim 1, wherein said reflecting member is concave.

11. A portable radio device comprising:

a display device for projecting light rays of a displayed image;

a lid with a reflecting member for reflecting said light rays of said displayed image at an enlarged scale;

a casing; and a module casing detachably connected to said casing;

wherein said lid and said display device being adjustable in their positional relationship for applying light rays of a displayed image projected from said display device to said reflective member; and wherein said display device being mounted in said module casing, said lid being angularly movably coupled to an end of said module casing by a hinge mechanism.

12. A portable radio device according to claim 11, wherein said module casing has an external interface connector, and said casing has a connector which electrically connects said casing to said external interface connector, said module casing being attached to said casing by said connector.

13. A portable radio device according to claim 11, wherein said display device is angularly movable for positional adjustment.

14. A portable radio device according to claim 11, for use as a portable telephone set.

* * * * *